No. 875,584. PATENTED DEC. 31, 1907.
H. D. JAMES.
MULTIPLE VOLTAGE SYSTEM OF CONTROL.
APPLICATION FILED MAY 6, 1907.
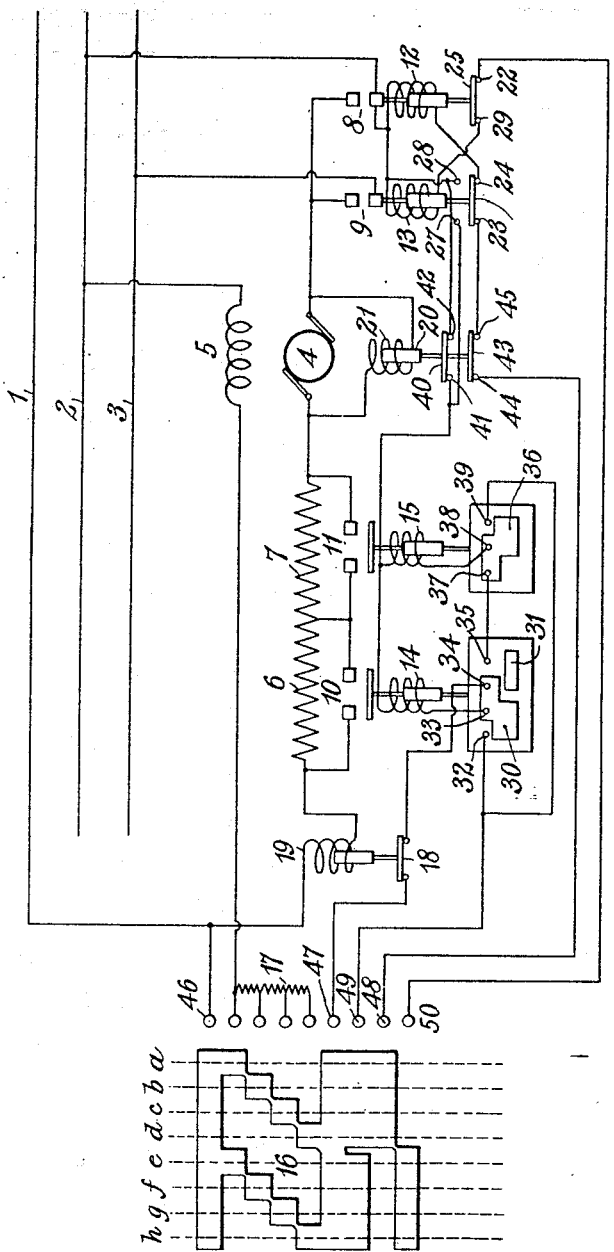
WITNESSES:
C. L. Belcher
Otto S. Schauer.
INVENTOR
Henry D. James
BY
Wiley S. Gann
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

MULTIPLE-VOLTAGE SYSTEM OF CONTROL.

No. 875,584.   Specification of Letters Patent.   Patented Dec. 31, 1907.

Application filed May 6, 1907. Serial No. 372,140.

*To all whom it may concern:*

Be it known that I, HENRY D. JAMES, a citizen of the United States, and a resident of Pittsburg, in the county of Allegheny and State of Pennsylvania, have invented a new and useful Improvement in Multiple-Voltage System of Control, of which the following is a specification.

My invention relates to systems of control for electric motors, and particularly to systems in which speed variation is effected by connecting the motor armature successively to circuits of different voltage.

The object of my invention is to provide, in a system of the character indicated, means for preventing the motor armature from becoming connected to a circuit of low voltage, after having been connected to a circuit of higher voltage, until the electromotive force generated by the motor approximates that of the lower voltage circuit.

The single figure of the accompanying drawing illustrates, diagrammatically, a system of control that embodies my invention.

The system, as shown, comprises a multiple-voltage circuit having three conductors 1, 2 and 3, a motor having an armature 4 and a field magnet winding 5, a resistance made up of two sections 6 and 7 that may be included in series with the armature 4, switches 8 and 9 for connecting the motor respectively to high and low voltage conductors 2 and 3, switches 10 and 11 for respectively shunting the resistance sections 6 and 7, operating or controlling magnet windings 12, 13, 14 and 15 for the switches 8, 9, 10 and 11, respectively, a master switch 16 for governing the circuits of the magnet windings 12 to 15, inclusive, and for governing the amount of a resistance 17 that is included in circuit with the field magnet winding 5, a relay switch 18 having an operating or controlling magnet winding 19 connected in series with the motor armature 4 and provided for the purpose of preventing removal of the resistance sections 6 and 7 from the armature circuit when the same is traversed by more than a predetermined amount of current, and a relay device 20 having an operating or controlling magnet winding 21 that is connected between the terminals of the motor armature and that becomes sufficiently energized to raise the device only when the difference of potential between terminals of the motor armature exceeds the lowest voltage of the circuit 1—2—3.

Associated with the switch 8, so as to be operated thereby, is an auxiliary or interlocking switch comprising contact terminals 29 and 22 and a member 25 normally bridging the same, and associated with the switch 9 is an interlocking switch comprising terminals 23 and 24, and a bridging member 26. These interlocking switches are provided for the purpose of preventing simultaneous closure of the switches 8 and 9 which would cause a short-circuit between the conductors 2 and 3. The member 26 also serves to bridge stationary contact terminals 27 and 28 when switch 9 is closed, for a purpose which will hereinafter appear.

The switch 10 operates an interlocking switch comprising movable segments 30 and 31 and stationary contact terminals 32, 33, 34 and 35, the said parts being so arranged that when the switch 10 closes the magnet winding 14 is disconnected from the operating circuit and is connected to a maintaining circuit, and also so that the winding 15 of the switch 11 is connected to the operating circuit. The switch 11 operates an interlocking switch comprising a movable segment 36 and stationary terminals 37, 38 and 39, so that, upon closing of the switch 11, the magnet winding 15 is disconnected from the operating circuit and connected to the maintaining circuit. The device 20 serves to operate two switches that are interposed, respectively, in the circuits of magnet windings 14 and 15 and of the magnet winding 12, the one switch comprising a bridging member 40 and stationary contact terminals 41 and 42, and the other switch comprising a bridging member 43 and stationary contact terminals 44 and 45. The windings 12, 14 and 15 may not be energized when the device 20 occupies its uppermost position, except that the windings 14 and 15 may be energized regardless of the position of the device 20 when the switch 9 is closed, because the member 26 then bridges contact terminals 27 and 28 and establishes a circuit in shunt to the switch comprising members 40, 41 and 42.

In the operation of the system, the master controller 16 is first moved to the position indicated by the broken line *a*, whereupon the field magnet winding 5 becomes connected between conductors 1 and 2, and another circuit is also established by way of devices bearing reference characters 1, 46, 48, 44, 43, 45, 23, 26, 24, 12 and 2. The magnet winding 12, when energized, causes the switch 8 to close, and the motor armature 4 becomes connected to the low-voltage circuit 1—2 with the resistance sections 6 and 7 in series therewith. If the current that traverses the armature circuit and the winding 19 is then insufficient to cause the switch 18 to open, a third circuit will be established by way of devices 1, 46, 47, 18, 34, 30, 33, 14, 41, 40, 42 and 2. The switch 10 will then be closed because of the energizing of magnet winding 14, which thereupon becomes connected in a maintaining circuit comprising devices 1, 46, 49, 32, 30, 33, 14, 41, 40, 42 and 2, the said circuit being independent of the relay switch 18. Thus the circuit of the magnet winding 14 remains intact and the switch 10 remains closed after having once been closed, regardless of the current fluctuations in the armature circuit. If the switch 18 remains closed, or when the current in the armature circuit decreases to a value to permit closure thereof, another circuit will be established by way of devices 1, 46, 47, 18, 34, 31, 35, 37, 36, 38, 15, 41, 40, 42 and 2. The switch 11 will then close because of the energizing of the magnet winding 15 and the resistance section 7 will be shunted.

As the master switch 16 is moved through the succeeding positions $b$, $c$ and $d$, gradually increasing amounts of resistance are inserted in the circuit of the field magnet winding and the speed of the motor is correspondingly increased. In moving the master controller from the position $d$ to the position $e$, the maintaining circuit of the magnet windings 14 and 15 is interrupted at the master controller, the switches 10 and 11 being thereby permitted to open and the circuit of a magnet winding 12 being also interrupted. When the master controller occupies the position $e$, a circuit is established by way of devices 1, 46, 50, 22, 25, 29, 30 and 2, and the switch 9 is closed because of the energizing of the magnet winding 13. The motor armature is then connected to the high voltage circuit 1—3 with both resistance sections 6 and 7 in series therewith. The device 20 will then be moved to its uppermost position and the circuit between the magnet winding 15 and the conductor 2 will be established by way of devices 27, 26 and 28, while the circuit of the magnet winding 12 will be interrupted at the switch 43—44—45. The switches 10 and 11 will then close in succession as before described, and if the master switch is moved through the succeeding positions $f$, $g$ and $h$, gradually increasing amounts of resistance will be inserted in the field magnet winding to cause corresponding increases in the speed of the motor.

If the master controller is returned from the position $e$, or any of the succeeding positions, to the position $d$, or any of the preceding positions, the circuit of the magnet winding 13 is interrupted, and the switch 9 opens, thereby disconnecting the motor armature from the high voltage circuit 1—3. The maintaining circuit of the windings 14 and 15 is also interrupted and the switches 10 and 11 open, leaving the resistance sections 6 and 7 in series with the armature 4. Energizing of the magnet winding 12, however, is prevented until the electromotive force generated by the motor armature has decreased to a value such that the magnet winding 21 permits the device 20 to drop to its lowermost position; i. e., to a value approximating that of the lower voltage circuit 1—2. Thus, the motor armature may not be connected to the low-voltage circuit after having been connected to the high-voltage circuit until the electromotive force generated by the motor approximates that of the low-voltage circuit, and injuries to the motor that might otherwise result are, therefore, avoided.

I claim as my invention:

1. The combination with a motor, and means for connecting the same successively to circuits of different voltage, of means for preventing connection of the motor to a circuit of low voltage after having been connected to a circuit of higher voltage until the electromotive force generated by the motor approximates that of the low voltage circuit.

2. The combination with a motor, and switches for connecting the same respectively to circuits of different voltage, of means for preventing closure of one of said switches for the purpose of connecting the motor to a circuit of low voltage after the same has been disconnected from the circuit of high voltage until the electromotive force generated by the motor approximates that of the low voltage circuit.

3. The combination with a motor, and switches for connecting the same respectively to circuits of different voltage, of means for preventing closure of one of said switches for the purpose of connecting the motor to a circuit of low voltage after the same has been disconnected from the circuit of high voltage until the electromotive force generated by the motor approximates that of the low voltage circuit, said means comprising a controlling magnet winding that is connected between the terminals of the motor armature.

4. The combination with a motor, and switches for connecting the motor repectively to circuits of different voltage, of controlling magnet windings for said switches and a relay switch having a controlling magnet winding connected between the terminals of the motor armature, the said relay switch being interposed in the circuit of the controlling magnet winding for the switch that connects the motor to a circuit of low voltage and being opened only when the electromotive force generated by the motor exceeds that of the low-voltage circuit.

5. The combination with a motor, and switches for connecting the same respectively to circuits of different voltage, of controlling magnet windings for the switches, and means for interrupting the circuit of the controlling magnet winding for the switch that is adapted to connect the motor to a circuit of low voltage when the electromotive force generated by the motor exceeds that of the low-voltage circuit.

6. The combination with a motor, and means for connecting the same successively to circuits of different voltage, of a device for preventing connection of the motor to a circuit when the electromotive force generated by the motor exceeds that of said circuit.

7. The combination with a motor, and means for connecting the same successively to circuits of different voltage, of a device for preventing connection of the motor to a circuit when the electromotive force generated by the motor exceeds that of said circuit, the said device having a controlling magnet winding connected between the terminals of the motor armature.

8. The combination with a motor, and switches for connecting the same respectively to circuits of different voltage, of means for preventing closure of the switch that is adapted to connect the motor to one of said circuits except when the electromotive force generated by the motor approximates that of said circuit.

In testimony whereof, I have hereunto subscribed my name this 29th day of April, 1907.

HENRY D. JAMES.

Witnesses:
    Ross W. Copeland,
    Birney Hines.